United States Patent Office
3,453,260
Patented July 1, 1969

3,453,260
CYCLIC ANHYDRIDE ESTERS OF CYCLODEXTRIN
Stanley M. Parmerter, Wheaton, and Earle E. Allen, Jr., Chicago, Ill., assignors to Corn Products Company, New York, N.Y., a corporation of Delaware
No Drawing. Filed Mar. 22, 1967, Ser. No. 625,017
Int. Cl. C08b *19/00;* C13l *1/10*
U.S. Cl. 260—209          18 Claims

ABSTRACT OF THE DISCLOSURE

There are disclosed ester products of cyclodextrin represented by the formula:

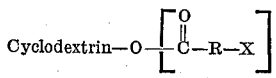

Where the expression in brackets represents the residue of a cyclic anhydride; and where R may be a cyclic, straight or branched alkyl or alkylene; and where X is a functional group such as carboxylic acid, amino and sulfonic acid. A method is shown for preparing such products by reacting a cyclodextrin with a cyclic anhydride. The cyclodextrin ester products of this invention may be used in ways suggested by the art for forming inclusion compounds with guest materials.

---

This invention relates to cyclodextrin ester products which are formed by reacting a cyclodextrin with a cyclic anhydride. Many of the products formed are the acid esters of cyclodextrin having a free carboxylic acid group; other ester products may have an acidic group such as a sulfonic acid or a basic group such as amino.

The cyclodextrins are a group of homologous oligosaccharides that are obtained from starch by the action of enzymes elaborated by *Bacillus macerans.* The cyclodextrins are known as Schardinger dextrins from an early investigator who studied these materials. They are homologous cyclic molecules containing 6 or more $\alpha$-D-glucopyranose units linked together at the 1,4 positions as in amylose. The cyclic molecule may also be referred to as a torus. As a consequence of the cyclic arrangement, this torus is characterized by having neither a reducing end group or a non-reducing end group. The torus molecule is depicted in the following schematic formula, where the hydroxyl groups are shown in the 2, 3 and 6 positions in the illustrated anhydroglucose units. The letter $n$ may be a number from 4 to 6, or higher.

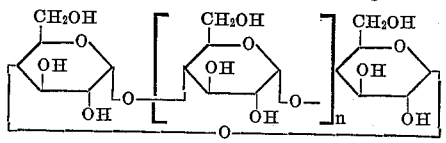

When $n$ is 4, the torus molecule is known as $\alpha$-cyclodextrin or cyclohexaamylose, because the torus contains six anhydroglucose units; when $n$ is 5, the seven unit member is known as $\beta$-cyclodextrin or cycloheptaamylose; and when $n$ is 6, the eight unit member is known as $\alpha$-cyclodextrin or cyclooctaamylose. When reference is made herein to "cyclodextrin," it is intended to include the foregoing forms as well so still other tori that have a still larger number of units in the molecule, and, as well, mixtures of these and other homologs.

Cyclodextrin is produced from starch by the action of an enzyme commonly known as cyclodextrin transglucosylase (*B. macerans amylase*). The source of the enzyme is usually a culture of *Bacillus macerans* which is grown under conventional conditions on conventional media containing sources of nitrogen, carbon, growth factors and minerals. The cyclodextrin transglucosylase may be produced by following published teachings such as, for example, those described by D. French in Methods in Enzymology, S. P. Colowick and N. O. Kaplan, editors, Academic Press, New York, N. Y., vol. V, 1962, pp. 148–155.

The cyclodextrin transglucosylase activity in cultures of *Bacillus macerans* may be measured by the Tilden-Hudson procedure as described by these two workers in J. Bacteriol, 43, 527–544, 1942. In general, the cyclodextrin transglucosylase is added to a dilute solution of a gelatinized starch, whereupon a conversion to cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma, may be fractionated by procedures such as those described by D. French et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of $\beta$-cyclodextrin, for example. No distillation is intended between the various homologous cyclodextrins or their mixtures unless otherwise indicated, when using the term "cyclodextrin."

Cyclodextrin is known as a clathrating compound, that is, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Cyclodextrin has established utility, and is the subject of study for further applications. It is understandably desirable to provide novel cyclodextrin structures to be used as inclusion compounds, and for other purposes.

It is one primary object of this invention to provide new cyclodextrin ester products in which the product has a free acidic or base group. It is the feature of this object that the acidic group may be a sulfonic or carboxylic acid so that the product is an acid ester.

It is another important object of the invention to provide a method for making ester products by reacting cyclic anhydrides with any one or mixture of homologous cyclodextrins. This object is effectively served by providing a relatively simple method which may be exercised to obtain a variety of cyclodextrin ester products.

It is still another object to obtain cyclodextrins with recognized properties, and to provide cyclodextrins which may be employed as intermediates for various processes.

A still further object is to provide cyclodextrin ester products of the foregoing type which are still usefully applied to form a variety of inclusion compounds, generally of the type recognized in the art.

Objects such as the foregoing are realized together with still other objects which will occur from considering the following disclosure:

The cyclodextrin ester products of this invention may be represented by the following formula:

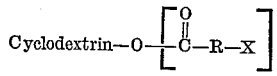

where X is an unreacted acidic or basic group; and where R is a group such as aryl, halogeno aryl, a cycloalkyl, a straight chain unsaturated or saturated aliphatic, or a branched chain unsaturated or saturated aliphatic. The basic group represented by X may be an amino, and the acidic group may be a sulfonic acid or a carboxylic acid group. When X is a carboxylic acid group the product is referred to as a cyclodextrin acid ester.

When R is a branch or straight chain aliphatic, residue whether saturated or unsaturated, it will commonly assume the form of a lower aliphatic having up to about eight carbons.

As is known, the anhydroglucose unit may have different degrees of substitution (D.S.) from one to three. In a given quantity of a cyclodextrin derivative, there will generally be some cyclodextrin molecules that are not substituted at all (D.S., 0), together with other molecules that have different degrees of substitution, from 1 to 3. A statistical average is employed to characterize the average D.S. of the entire quantity, although the figure is ordinarily stated as the D.S. rather than the average D.S. The esters of cyclodextrin prepared according to this invention may have a varying range of D.S. which may be as little as 0.0001, up to the maximum level of three.

Irrespective of the number of molecules of cyclodextrin which are reacted, or the actual sequence of substitution, or the number of anhydroglucose units involved, the general formula is intended to represent products where the substitution may occur to various degrees of substitution on all or less than all anhydroglucose units in all or less than all cyclodextrin molecules. This may be expressed herein in various ways, for exampe, by referring to an average D.S., a varying D.S. per average anhydroglucose unit, or an average D.S. per anhydroglucose unit. All such terms will include the foregoing concepts.

The ester products of cyclodextrin are prepared by reacting a cyclodextrin with a cyclic anhydride of the type represented by the following formulas:

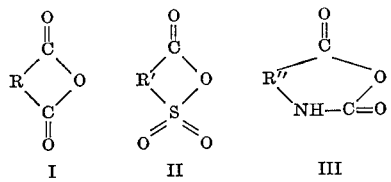

The cyclic anhydride shown at I will form the half esters when reacted with a cyclodextrin, such products being represented by the following formula:

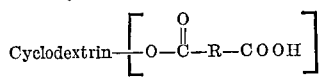

The radical represented by R may be an aryl, a halogeno aryl, a straight chain unsaturated aliphatic, a straight chain saturated aliphatic, a branched chain unsaturated aliphatic, or a branched chain saturated aliphatic.

The cyclic anhydride reaction shown at II will form ester products represented by the formula:

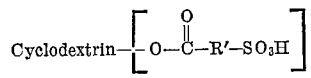

where R' may be the same as R but is preferably an aryl or a substituted aryl.

The cyclic anhydride shown at III results in ester products as represented by the following formula:

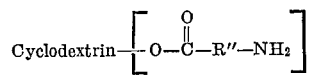

where R" is the same as R, but also is preferably an aryl or a substituted aryl.

The foregoing reactions may be conducted in a substantially dry state wherein substantially no solvent is present. The reaction may optionally be conducted in the presence of an organic solvent such as DMF (dimethyl formamide), or dioxane, benzene, toluene, hexane, and the like.

In general, the reactions are conducted in the presence of an alkaline catalyst or in an alkaline medium. The ordinarily successful reactions in the presence of an alkaline reagent are not realized, on occasion, with some cyclic anhydride reactions, particularly maleic anhydride. It is preferred that reaction with this cyclic anhydride and others be run in an acidic medium. Such a reaction leads to production of some diester, and also at the same time results in substantial production of the acid ester.

A variety of cyclic anhydrides may be employed successfully in the present invention, among which may be included aryl containing cyclic anhydrides such as phthalic anhydride, substituted aryl such as tetrabromophthalic anhydride; cyclic anhydrides containing saturated cyclic groups such as tetrahydrophthalic anhydride; unsaturated cyclic anhydrides such as maleic, itaconic, allyl succinic; saturated cyclic anhydrides such as succinic, adipic; pimelic, suberic, azelaic, sebacic; other cyclic anhydrides which lead to a cyclodextrin ester with a basic group such as isatoic anhydride; and other cyclic anhydrides which lead to cyclodextrin esters with other acidic groups such as o-sulfobenzoic anhydride.

The following examples are presented to teach various embodiments for practicing the invention, but it should be understood that such embodiments are also representative of some compositions of matter which may be prepared by the methods disclosed.

EXAMPLE I

β-Cyclodextrin acid phthalate

A mixture of 74 g. of phthalic anhydride, 79 g. pyridine, 28 g. β-cyclodextrin and 100 ml. of toluene was heated at 100° C. for 18 hours. The reaction was then terminated and ice water added thereto followed by acidification with hydrochloric acid. The gummy product was separated and ground in water to cause it to solidify. It was then extracted for one hour with boiling water. The residue was again ground in cold water and dried to give 67 g. of a tan product which was soluble in dilute sodium hydroxide but insoluble in water.

Analysis of the product indicated 21.5% carboxyl which corresponded to a D.S. of 2.68.

EXAMPLE II

α-Cyclodextrin acid phthalate

The procedure of Example I is followed wherein the reaction mixture is formed from 9.7 g. of α-cyclodextrin and 10.4 g. of phthalic anhydride in 100 ml of toluene and 5.6 g. of pyridine. The product is obtained in a yield of 7.1 g. and melts at 240°–250° C. after softening at 170° C. The product is insoluble in water, but soluble in dilute sodium hydroxide, methanol, ethanol and acetone. Analysis shows a 15.3% content of carboxyl which corresponds to a D.S. of 1.1.

EXAMPLE III

β-Cyclodextrin acid maleate

A mixture is made of 57 g. of β-cyclodextrin and 15 g. of maleic anhydride in 40 ml. of dimethylformamide. The mixture is thoroughly blended and then heated in a vacuum oven at 100° C. for four hours. The mixture is dispersed in 150 ml. of cold water and filtered. The solid product is washed thoroughly with methanol and dried. It decomposes at about 270° C. and is soluble in warm water. By analysis it contains 3.8% carboxyl and 13.5% ester calculated as acetate equivalents. This indicates that about one half of the maleic anhydride is converted to the diester and the other half to the acid ester.

EXAMPLE IV

β-Cyclodextrin acid maleate

A solution is prepared of 49 g. of maleic anhydride in 100 ml. of dry toluene, and to this solution is added 28.4 g. of dried β-cyclodextrin. The mixture is then stirred for six hours at 100° C. The mixture solidifies upon cooling, and it is broken up by stirring in acetone before collecting the formed solid. The solid is collected in a yield of 73 g. A slurry is then made of the solid in water, the pH is adjusted to 6.0 with dilute sodium hydroxide, and then boiled for two hours. Addition of acetone causes 64 g. of a white powder to separate. The product is insoluble in methanol, but it dissolves as acid is added. Following analysis, the product is shown to contain 8.0% carboxyl.

EXAMPLE V

β-Cyclodextrin o-amino benzoate

A slurry is prepared by adding 56.7 g. of β-cyclodextrin to 100 ml. of water. The pH of the water slurry is adjusted to 8.5 with 2.033 N sodium hydroxide. To the slurry is then added 0.35 mole (57 g.) of isatoic anhydride gradually over a one hour period. The resulting mixture is then stirred for two more hours while maintaining the pH within a range of 8-9. This required a total volume of 200 ml. of the 2.033 N sodium hydroxide which was added at the beginning and continued to the third hour of the reaction. After this three hour period, the pH is raised to 11 with the addition of 200 ml. of the 2.033 N sodium hydroxide. The mixture is then filtered, redispersed in water, and the pH is adjusted to 2.0 The precipitate is filtered and washed with about 4-5 liters of water. The product is then air dried in an oven at 55° C. Analysis showed a N content of 4.24% which corresponds to a D.S. of 0.77.

The cyclodextrin ester products of this invention may be utilized in a variety of ways. They may be used, for example, in ways suggested by the art for forming inclusion compounds with guest materials. The ester products of this invention in general show decreased water solubility over cyclodextrin as such, and generally show increased solubility in alkaline solvents over the cyclodextrin materials. Such differential solubility can additionally be used to advantage in employing the ester products for clathration. The cyclodextrin ester product with a basic amino group dissolves in an acidic solvent which opens up the possibility for preferential clathration in acid media. The half esters which are reaction products of cyclodextrin and unsaturated cyclic anhydrides may be employed as lubricants or plasticizers for various polymers. The cyclodextrin ester products which include unsaturated cycloaliphatic or aliphatic portions may also be used as intermediates to form various polymers, for example, by reacting a vinyl type monomer with a double bond portion of the cyclodextrin ester to form polyester type of polymers.

The invention may now be practiced in the various ways which will occur to practitioners, but such practice will comprise a part of this invention so long as its falls within the terms of the appended claims as given further meaning by the language of the preceding specification.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. An ester product of cyclodextrin represented by the formula:

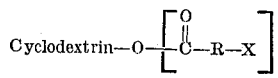

where R is of the class consisting of monocyclic aryl, monocyclic halogeno aryl, lower straight chain unsaturated and saturated aliphatic, and lower branched chain unsaturated and saturated aliphatic; and X is of the class consisting of carboxy, amino and sulfo.

2. A product as in claim 1 which is represented by the formula

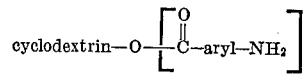

3. A product as in claim 1 which is represented by the formula

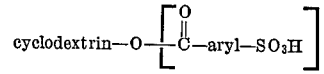

4. A product as in claim 1 which is represented by the formula

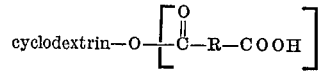

5. A product as in claim 4 which is a cyclodextrin acid phthalate.

6. A product as in claim 4 which is a cyclodextrin acid tetrabromophthalate.

7. A product as in claim 4 which is a cyclodextrin acid maleate.

8. A product as in claim 4 which is a cyclodextrin acid itaconate.

9. A product as in claim 4 which is a cyclodextrin acid allyl succinate.

10. A product as in claim 4 which is a cyclodextrin acid glutarate.

11. A product as in claim 4 which is a cyclodextrin acid succiante.

12. A product as in claim 4 which is a cyclodextrin acid adipate.

13. A product as in claim 4 which is a cyclodextrin acid tetrahydrophthalate.

14. A product as in claim 4 which is a cyclodextrin acid pimelate.

15. A product as in claim 4 which is a cyclodextrin acid suberate.

16. A product as in claim 4 which is a cyclodextrin acid azelate.

17. A product as in claim 4 which is a cyclodextrin acid sebacate.

18. A product as in claim 4 where the cyclodextrin moiety has 6 and more than 6 cyclic anhydroglucose units, and where the expression in brackets represents various degrees of substitution per average anhydroglucose unit.

References Cited

UNITED STATES PATENTS

| | | | |
|---|---|---|---|
| 2,661,349 | 12/1953 | Caldwell et al. | 260—234 |
| 2,809,190 | 10/1957 | Kelly et al. | 260—234 |
| 3,053,830 | 9/1962 | Gaertner | 260—234 |
| 3,098,065 | 7/1963 | Crecelius et al. | 260—234 |

LEWIS GOTTS, *Primary Examiner.*

J. R. BROWN, *Assistant Examiner.*

U.S. Cl. X.R.

252—56; 260—174

PO-1050
(5/69)

UNITED STATES PATENT OFFICE
CERTIFICATE OF CORRECTION

Patent No. 3,453,260                  Dated July 1, 1969

Inventor(s) Stanley M. Parmerter, Earle E. Allen, Jr.

It is certified that error appears in the above-identified patent and that said Letters Patent are hereby corrected as shown below:

Column 1, line 46 "or" should read "nor";

Column 1, line 64 "so" should read "as";

Column 2, line 27 "distillation" should be "distinction";

Column 2, line 46 "base" should read "basic";

Column 6, line 40 "succiante" should read "succinate".

SIGNED AND
SEALED
MAR 17 1970

(SEAL)
Attest:

Edward M. Fletcher, Jr.
Attesting Officer

WILLIAM E. SCHUYLER, JR.
Commissioner of Patents